July 5, 1932. C. SIFTON ET AL 1,865,648
TRANSMISSION MECHANISM
Filed June 25, 1931
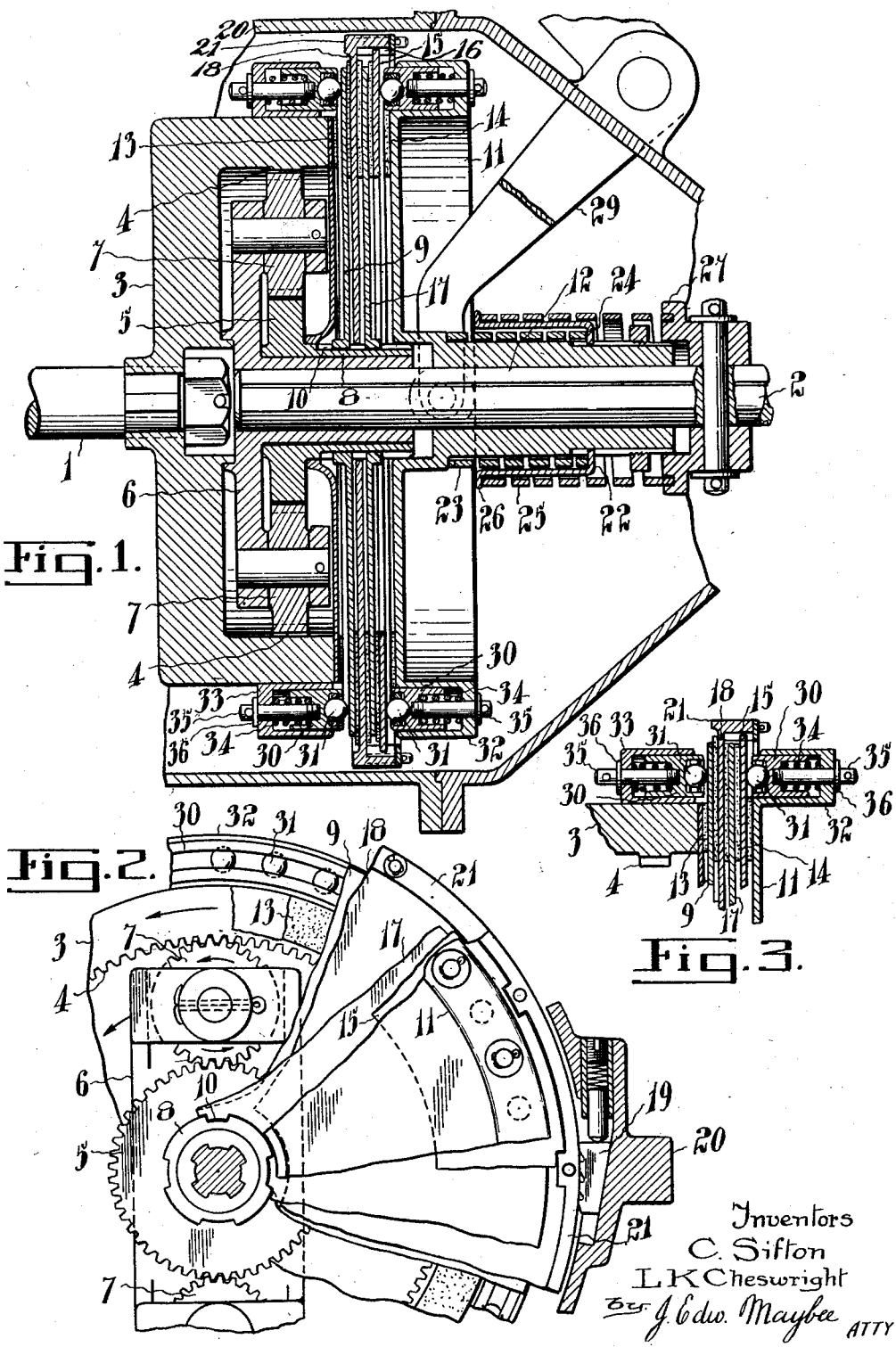
Inventors
C. Sifton
L. K. Cheswright
by J. Edw. Maybee ATTY Patented July 5, 1932

1,865,648

UNITED STATES PATENT OFFICE

CLIFFORD SIFTON, OF TORONTO, ONTARIO, AND LEONARD K. CHESWRIGHT, OF SWANSEA, ONTARIO, CANADA

TRANSMISSION MECHANISM

Application filed June 25, 1931. Serial No. 546,748.

This invention relates to mechanism adapted to obtain a gradual engagement for direct drive between two alined shafts by the use of epicyclic gearing which will give a variable speed of the driven shaft from zero up to the speed of the driving shaft with increased torque at the lower speeds. Such a device is shown and described in the co-pending application, 463,083, filed June 23rd, 1930.

While the prior construction was well adapted for many purposes, the maximum torque obtainable from the speed reducing gear is not in practice attained as there are frictional losses involved at the lower speeds owing to frictional engagement between parts carried by driving and driven members respectively, and our present object is to devise a modification of the earlier construction which will avoid these frictional losses.

We attain our object by means of a construction which may be briefly described as follows. A driving and driven shaft arranged in alinement are connected by an epicyclic gear train including a rotatable part concentric with the shafts. Means are provided for applying a variable braking resistance between this part and a stationary part. Means are also provided for applying a braking resistance between the rotatable part and the driving and driven shafts. By manually controllable means the first braking resistance is applied, and by a continued movement of the manually controllable means the second resistance may then be applied.

In the form of the invention illustrated both resistances are fully applied to effect a direct drive connection between the driving and driven shafts.

The invention is hereinafter more fully described and is illustrated in the accompanying drawing in which Fig. 1 is a longitudinal section of gearing constructed in accordance with our invention;

Fig. 2 an elevation, partly broken away and partly in section, to show the superimposing of friction surfaces and the overrunning clutch; and Fig. 3 a sectional detail showing all the frictional surfaces engaged.

In the drawing like numerals of reference indicate corresponding parts in the different figures.

Referring particularly to Figs. 1 and 2, 1 and 2 are shafts, and on the driving shaft 1 is secured a drum 3 carrying an internal gear wheel 4. On the driven shaft 2 is revolubly mounted a sun pinion 5. On the shaft 2 is also secured a frame 6 carrying one or more planetary gears 7 meshing with both the sun pinion and the internal gear 4. On the hub 8 of the sun pinion is mounted a brake disk 9 by means of a feather key 10, the connection being such that, while the disk is revolvable with the sun pinion, it is also axially movable relative thereto. Similarly mounted on the hub 8 is a second brake disk 17. On the shaft 2 is mounted a brake disk 11 by means of a keyway 12, the connection being such that, while the disk is revolvable with the shaft, it is also slidable axially thereof.

The drum 3 and the disk 11 are respectively provided with the brake surfaces 13, 14, the surface 13 being adapted to engage the outer side of the disk 9 while the surface 14 is presented to the outer face of the brake disk 15, which is mounted to slide axially of the device on a keyway 16 on the ring 21. This ring has secured thereto the brake disk 18 positioned between the brake surface 9 and the brake disk 17. This ring 21 forms the inner part of an overrunning clutch, the outer part 19 of which is secured to the stationary housing 20. Any suitable form of overrunning clutch may be employed.

Any known shifting means may be provided for axially moving the brake disk 11 to engage the braking surfaces of the various disks. Preferably I provide means for applying resilient pressure to produce the desired movement.

In the drawing I show a cylindrical housing 22 connected with the hub of the brake disk 11. In this housing is positioned a coil spring 23 engaging the hub of the disk 11 and a collar 24 on the housing. Externally of the housing 22 is positioned a coil spring 25 bearing against a collar 26 formed at the inner end of the housing 22 and against a collar 27 secured to the driven shaft 2. The pressure of these springs is sufficiently strong to press the braking surfaces of the device so tightly together that they lock and rotate as a unit, this movement being made possible by the overrunning clutch connection of the ring 21. A shifter device 29 of any ordinary type is provided whereby the housing 22 may be shifted as desired to relieve the tension of the springs and thus reduce the frictional engagement between the surfaces of the brake members. The drum 3 and the brake disk 11, it will be seen, are provided with ball races 30 provided with balls 31 bearing against the outer faces of the brake disks 9 and 15. These ball races 30 are slidably mounted in the housing 32, 33, and coil springs 34 bearing against the housings and races normally tend to press the balls 31 into contact with the adjacent disks. This movement is limited by means of the stems 35 connected to the respective ball races and extending through the rear ends of the housings, washers 36 pinned to the outer ends of the stems engaging the outer sides of the ends of the housings and thus limiting the movement of the ball races.

Initially the parts may be assumed to be in the position shown in Fig. 1 with the brake surfaces all disengaged. It follows then that, if sufficient pressure be exerted on the disk 11 by the springs 23 and 25, first of all the adjacent surfaces of the brake disks 9, 17, 15 and 18 will be engaged. A resistance is thus provided against the rotation of the sun pinion relative to the ring 21, which is held stationary by its clutch engagement with the housing. A fulcrum is thus provided against which the gearing reacts so that the full benefit of reduced speed and increased power of the gearing is thus obtained giving the desired increased torque at starting. The ball bearings hold the disks on the sun pinion out of engagement with the braking surfaces 13 and 14 at this time so that the frictional losses are small. As further pressure is applied to move the disk 11, the ball races recede in their housings and the braking surfaces 13 and 14 engage the outer surfaces of the disks 9 and 15 and increasing resistance is thus provided to the relative rotation of the driving and driven shafts. Variable speeds are thus obtained as the relative movement of the two shafts depends on the extent of the frictional retardation of the brake disks 9 and 15.

When the pressure between the parts is sufficiently increased, the various braking surfaces will be clamped together to hold the sun pinion from rotation. The two shafts are then caused to revolve together if the shaft 1 be driven.

What we claim as our invention is:

1. In transmission mechanism, the combination of alined driving and driven shafts; an epicyclic gear train forming a driving connection between the two shafts including a rotatable part concentric with the shafts; means, initially inoperative, for applying a variable frictional resistance to the rotation of said part relative to the driven shaft; a stationary part provided with a braking surface; means, initially inoperative, for applying a variable braking resistance to the rotation of the rotatable part relative to the stationary part; and manually controlled means adapted by a continuous uni-directional movement to first apply braking resistance to the movement of the rotatable part relative to the stationary part and subsequently apply braking resistance to the rotation of said part relative to the shafts; and means for automatically releasing the second mentioned braking resistance after both have been applied.

2. In transmission mechanism, the combination of alined driving and driven shafts; an epicyclic gear train forming a driving connection between the two shafts including a rotatable part concentric with the shafts; means, initially inoperative, for applying a variable frictional resistance to the rotation of said part relative to the driven shaft; a stationary part; a braking disk having an overrunning clutch connection with the said part whereby the said disk can rotate only in the same direction as the normal direction of rotation of the shafts; means, initially inoperative, for applying a variable braking resistance to the rotation of the rotatable part relative to the stationary part; and manually controlled means adapted by a continuous movement to first apply braking resistance to the movement of the rotatable part relative to the braking disk carried by the stationary part and subsequently apply braking resistance to the rotation of said rotary part relative to the shafts.

3. In transmission mechanism, the combination of alined driving and driven shafts; an epicyclic gear train including a rotatable part concentric with the shafts; a braking disk carried by said part to rotate therewith; a braking disk carried by and rotatable with one of the shafts and engageable with the braking disk of the rotatable part; a stationary part; a braking disk carried by said stationary part concentric with the shafts and engageable by the braking disk of the rotatable part; an overrunning clutch connection between said braking disk and the stationary part allowing rotation of said disk relative to the stationary part only in the normal direction of rotation of the shafts; means for pressing the frictional surfaces into engagement; and spring pressed anti-friction engaging means supported on the braking disk carried by the shaft and engaging the adjacent braking part, whereby the braking disks of the rotary part and stationary part are first engaged, and the braking disks of the shaft and the rotary part subsequently engaged.

4. In transmission mechanism, the combination of alined driving and driven shafts; an epicyclic gear train including a rotatable part concentric with the shafts; a plurality of braking disks carried by said part to rotate therewith; two braking disks, one for each shaft, rotatable with said shafts; a stationary part; two braking disks carried by said stationary part concentric with the shafts and alternated with the other disks; an overunning clutch connection between said braking disks and the stationary part allowing rotation of said disks and the stationary part only in the normal direction of rotation of the shafts; means for pressing the frictional surfaces into engagement, certain of the disks being slidable axially of the parts to permit of the movement; and spring pressed anti-friction engaging means supported on the braking disks of the shafts and engaging the adjacent braking surfaces, whereby the braking disks of the rotary part and stationary part are first engaged and the braking disks of the shaft and the rotary part subsequently engaged.

5. Transmission mechanism according to claim 1 in which spring pressed means are provided between adjacent braking surfaces to hold the first mentioned braking resistance means out of action until a predetermined pressure has been applied to the second mentioned braking resistance.

6. Transmission mechanism according to claim 2 in which spring pressed means are provided between adjacent braking surfaces to hold the first mentioned braking resistance means out of action until a predetermined pressure has been applied to the second mentioned braking resistance.

Signed at Toronto, Canada, this 16th day of June, 1931.

CLIFFORD SIFTON.
LEONARD K. CHESWRIGHT.